United States Patent
Leabman

(10) Patent No.: US 8,880,059 B2
(45) Date of Patent: Nov. 4, 2014

(54) SYSTEM AND METHODS FOR MEDIA ACCESS CONTROL OPTIMIZATION FOR LONG RANGE WIRELESS COMMUNICATION

(75) Inventor: Michael A. Leabman, San Ramon, CA (US)

(73) Assignee: TruePath Technologies, LLC, Richmond, VA (US)

( * ) Notice: Subject to any disclaimer, the term of this patent is extended or adjusted under 35 U.S.C. 154(b) by 609 days.

(21) Appl. No.: 12/830,329

(22) Filed: Jul. 4, 2010

(65) Prior Publication Data

US 2011/0034200 A1 Feb. 10, 2011

Related U.S. Application Data

(60) Provisional application No. 61/213,999, filed on Aug. 6, 2009, provisional application No. 61/272,001, filed on Aug. 6, 2009.

(51) Int. Cl.
| | |
|---|---|
| *H04W 4/00* | (2009.01) |
| *H01Q 3/26* | (2006.01) |
| *H04B 7/185* | (2006.01) |
| *H01Q 1/24* | (2006.01) |
| *H04W 84/06* | (2009.01) |

(52) U.S. Cl.
CPC ............. *H01Q 1/246* (2013.01); *H01Q 3/267* (2013.01); *H01Q 3/2611* (2013.01); *H04B 7/18506* (2013.01); *H04W 84/06* (2013.01); *H01Q 3/2605* (2013.01)
USPC ........................................................ 455/431

(58) Field of Classification Search
USPC ............... 455/562.1, 436, 453, 25, 63.4, 450, 455/452.2, 454, 509
See application file for complete search history.

(56) References Cited

U.S. PATENT DOCUMENTS

| | | |
|---|---|---|
| 5,790,071 A | 8/1998 | Silverstein et al. |
| 6,430,412 B1 | 8/2002 | Hogg et al. |

(Continued)

OTHER PUBLICATIONS

S.H. Breheny et al. "Using Airborne Vehicle-Based Antenna Arrays to Improve Communications with UAV Clusters", Proceedings of the 42$^{nd}$ IEEE Conference on Decision and Control, Hawaii USA, Dec. 2003, pp. 4158-4162.

(Continued)

*Primary Examiner* — Kwasi Karikari
(74) *Attorney, Agent, or Firm* — Kang S. Lim

(57) ABSTRACT

A system and method for media access control optimization for long distance wireless communication between an airborne platform and a surface base station is provided. The system includes receiving an incoming beamform signal. The incoming beamform signal includes a data portion and a token. It is possible, in some embodiments, that the data portion and the token are independently modulated. The token identifies a subsequent transmitter by including any of: an identification of which transmitter is to transmit next, length of time the next transmitter should transmit for, and transmit timing data. The system may then transmit an outgoing beamform signal including a data portion and a token. After which the system may wait for a return transmission, or a timeout. The system may also be enabled, in some embodiments, to maintain a list of active transmitters. This list of active transmitters may be updated periodically by adding and removing particular transmitters according to successful response transmissions.

13 Claims, 2 Drawing Sheets

(56) References Cited

U.S. PATENT DOCUMENTS

| | | | |
|---|---|---|---|
| 6,642,894 B1 | 11/2003 | Gross et al. | |
| 6,931,247 B2 | 8/2005 | Cox et al. | |
| 7,359,703 B2 | 4/2008 | McGuffin et al. | |
| 7,558,569 B2 | 7/2009 | Chang et al. | |
| 2002/0024975 A1 | 2/2002 | Hendler | |
| 2003/0210674 A1* | 11/2003 | Honkasalo et al. | 370/338 |
| 2006/0178143 A1 | 8/2006 | Chang et al. | |
| 2006/0229104 A1* | 10/2006 | de La Chapelle et al. | 455/562.1 |
| 2007/0087694 A1 | 4/2007 | Jin et al. | |
| 2007/0184846 A1 | 8/2007 | Horton, Jr. et al. | |
| 2007/0232299 A1 | 10/2007 | Alcorn | |
| 2007/0263748 A1 | 11/2007 | Mesecher | |
| 2008/0075037 A1 | 3/2008 | Guo et al. | |
| 2008/0139124 A1 | 6/2008 | Tillotson | |
| 2008/0152029 A1* | 6/2008 | Kwon et al. | 375/260 |
| 2008/0240062 A1 | 10/2008 | Lynch et al. | |

OTHER PUBLICATIONS

H. Schippers et al., "Broadband Optical Beam Forming for Airborne Phased Array Antenna", 2008 IEEE Aerospace Conference, Mar. 8, 2008, pp. 1-17.

ISA/KR, PCT International Search Report and Written Opinion, Application No. PCT/US2010/044621, dated Apr. 21, 2011, 9 pages.

ISA/KR, PCT International Search Report and Written Opinion, Application No. PCT/US2010/044622, dated May 2, 2011, 10 pages.

ISA/KR, PCT International Search Report and Written Opinion, Application No. PCT/US2010/044623, dated Apr. 27, 2011, 10 pages.

ISA/KR, PCT International Search Report and Written Opinion, Application No. PCT/US2010/044624, dated Apr. 21, 2011, 8 pages.

ISA/KR, PCT International Search Report and Written Opinion, Application No. PCT/US2010/044625, dated Apr. 21, 2011, 8 pages.

* cited by examiner

SYSTEM AND METHODS FOR MEDIA ACCESS CONTROL OPTIMIZATION FOR LONG RANGE WIRELESS COMMUNICATION

CROSS REFERENCE TO RELATED APPLICATIONS

This application claims priority to provisional application No. 61/213,999 filed Aug. 6, 2009, entitled "Broadband Wireless Communication", by Michael Leabman, which is incorporated by reference herein for all purposes.

Further, this application claims priority to provisional application No. 61/272,001 filed Aug. 10, 2009, entitled "MAC and Antenna Optimizations for Long-Distance Wireless Communication", by Michael Leabman, which is incorporated by reference herein for all purposes.

Additionally, this application is related to co-pending application Ser. No. 12/830,324, filed Jul. 4, 2010, entitled "System and Methods for Wireless Broadband Delivery of Data", by Michael A. Leabman, which is incorporated by reference herein for all purposes.

Additionally, this application is related to co-pending application Ser. No. 12/830,326, filed Jul. 4, 2010, entitled "System and Methods for Simultaneous Wireless Broadband Communication Between Multiple Base Stations", by Michael A. Leabman, which is incorporated by reference herein for all purposes.

Additionally, this application is related to co-pending application Ser. No. 12/830,327, filed Jul. 4, 2010, entitled "System and Methods for Antenna Optimization for Wireless Broadband Communication", by Michael A. Leabman, which is incorporated by reference herein for all purposes.

Additionally, this application is related to co-pending application Ser. No. 12/830,328, filed Jul. 4, 2010, entitled "System and Methods for Scalable Processing of Received Radio Frequency Beamform Signal", by Michael A. Leabman, which is incorporated by reference herein for all purposes.

BACKGROUND OF THE INVENTION

The present invention relates to data delivery systems and methods. More particularly, the present invention relates to systems and methods for the optimization of a Media Access Control (MAC) protocol for the enablement of delivering data over long range wireless communication systems, such as communications between an aircraft and surface base stations. In some embodiments, this data delivery system may provide data at high throughput data rates exceeding 100 Mbps to enable the transfer of a wide variety of safety, operational and passenger data.

Communication and information access is imperative to the aviation industry. Earliest commercial aircrafts had primitive voice communication with surface personnel over two way shortwave radio. Not only did this communication dramatically improve flight safety, it also enabled accelerated commercialization of air transport on a level not previously known.

Since then, aircraft have been further upgraded with advent of radar, computers, and even data links to further improve communications. These technologies serve to improve in-flight safety and provide amenities to passengers. However, true broadband high-throughput data uplinks are typically lacking for the airline industry. This is due to a combination of technical and financial constraints which have historically made it impractical, or even impossible, to supply high bit rate data connectivity to an entire fleet of commercial airliners.

However, regardless of hurdles, there is a need to enable broadband wireless communication for aircraft. This need may generally be broken down into operational needs (i.e., maintenance and repair), air safety needs and passenger generated needs.

Operational (maintenance) needs are driven by cost savings the airline may recapture by knowing, real-time, the condition of the aircraft. Gigabytes of flight data are accumulated for each flight but are not easily accessible until after the aircraft has landed (or are even totally inaccessible if not stored for later retrieval). This renders real time engine trends, fuel consumption rates, and parts performance variances unavailable for timely repairs and cost savings. This data is often discarded because downloading the data currently is too slow or too expensive. In newer aircrafts, such as the Boeing 777 or the Airbus 380, some such operational data may be provided on a real time basis to ground personnel in some cases; however, this data is often limited and relies upon low bit rate speeds. Generally, important operational data is collected and downloaded via a wired access port when the aircraft has landed. This data collection, however, is not real time data, and cannot be utilized to preplan maintenance needs.

Safety needs include the ability to identify causes and possibly prevent disastrous accidents. Currently, the flight recorder (i.e., "Black Box") of an aircraft is accessible after a aircraft crash. A Cockpit Voice Recorder (CVR) is an audio recorder which is often very useful in identifying causes of the accident. Further, depending upon crash location the flight recorder and/or CVR are often never found. Without the flight recorder and/or CVR, it may be impossible to determine what caused the crash. Besides satisfying public curiosity and aiding the bereaved, this causal data is very important in generating protocols and/or safety inspections to prevent future similar accidents. Likewise, if critical aircraft conditions were known by ground personnel in real time, potential disasters could possibly be identified and addressed before they happen. These safety needs are currently unmet given current limited data bandwidth to aircrafts.

Lastly, there are a number of passenger generated needs for larger data bandwidth. For example, unfettered Internet access for passengers could generate high advertising revenues. Likewise, high-speed Internet surfing would facilitate more passenger purchases and commissions for airlines. The limited internet access currently offered by airlines discourages use due to its slow speeds and relative cost.

Those aircraft that are equipped to provide Internet access, or data communication, typically do so at little more than dial-up speeds. This is due, as stated earlier, to current technological and financial hurdles. One simple approach would be to purchase licensed radio frequency (RF) spectrum to devise a dedicated surface to aircraft communication network. However such a system would requires substantial spectrum to service an airline fleet and is thus financially prohibitive. For example, it is expected that 160 MHz of spectrum would be required to achieve the desired performance. A recent purchase by Verizon of 14 MHz cost the company between one and two billion dollars. Of course some spectrum is more valuable than others depending upon services envisioned. Cellular and close to cellular spectrum is considered prime spectrum real estate. Regardless, in order to purchase the necessary spectrum of licensed RF would require an exorbitant capital investment of multiple billions of dollars.

Other approaches to providing data connectivity to aircrafts are to install Satellite Ku Band or Cellular receivers. The weight of a Satellite system is roughly 450 pounds. A cellular system may weigh less, but is still a substantial 125 pounds of excess weight. Weight in an aircraft is directly related to further fuel consumption. Thus, these systems may cost the airline a lot over the course of their usable lifetimes.

In addition to fuel costs, the units themselves are costly. The cellular system has a substantial cost of upwards to one hundred and twenty five thousand dollars upfront per aircraft. The cost for a satellite system may be even larger at upwards to four hundred and fifty thousand dollars. Additionally, the cost of maintenance for the satellite system may tack on an additional hundred thousand dollars or so per year per aircraft, and the array on the aircraft may, in some cases, generate substantial aerodynamic drag.

Additionally, the operational costs of these devices may be very large based upon the size of data being transmitted. It may be costly to send sizable data over satellite or cellular systems.

Lastly, the data rates for these systems are still relatively low; satellite operates at roughly 1.5 Mbps per aircraft, and Cellular systems operate between 0.25 and 2.0 Mbps. Further, signal reliability may be of issue for cellular systems.

Only recently has new technology surfaced which, through sophisticated beamforming protocols, is enabled to affordably provide the required data transfer rates between aircraft and surface base stations at long distances. For an overview of the system utilized to provide this wireless data delivery, see the co-pending application Ser. No. 12/830,324, filed Jul. 4, 2010, entitled "System and Methods for Wireless Broadband Delivery of Data", by Michael A. Leabman, which is incorporated by reference herein for all purposes, as noted above in the cross reference section.

To maximize spectral efficiency, devices in a wireless networking system, such as the long distance wireless data delivery system disclosed, typically share one or more communication channels. However, two devices simultaneously transmitting on the same communication channel may harmfully interfere with one another. Accordingly, some mechanism is typically employed to arbitrate resource contention, such that devices do not interfere with one another. For example, in the IEEE 802.11 ("WiFi") protocol, devices use carrier sense to determine whether a communication channel is available for use. Essentially a transmitting device listens to see if any other device is transmitting before itself transmitting. If the channel is clear (i.e., if the transmitting device does not detect any other transmissions), then the device transmits after some random wait time. This technique of using carrier sense to arbitrate resource contention is called Carrier Sense Multiple Access With Collision Avoidance ("CSMA/CA"). The IEEE 802.11-2007 standard is hereby incorporated by reference in its entirety for all purposes.

However, in the case of large distances between transmission source and receiver, delays due to signal propagation may render known protocols inefficient, or even unworkable. Thus, the typical WiFi protocol as discussed above may be inadequate to enable efficient communications when dealing with long range applications, such as the data delivery system between aircraft and base stations as disclosed above.

In view of the foregoing, systems and methods for MAC optimization for long distance wireless communication are disclosed. The present invention provides a novel system and protocols for enabling data communications in long distance situations, such as those between aircraft and base stations.

SUMMARY OF THE INVENTION

The present invention discloses an airborne data delivery system. More particularly, the present invention teaches systems and methods for media access control optimization for long-range wireless broadband communication between an airborne platform and terrestrial base station. The optimized media access control protocol, in some embodiments, may be utilized to provide high speed data transmission to airborne platforms over a long distance in a cost effective manner.

In one embodiment, the system and method for media access control optimization for long distance wireless communication between an airborne platform and a surface base station is provided. The system includes receiving an incoming beamform signal. The incoming beamform signal includes a data portion and a token. It is possible, in some embodiments, that the data portion and the token are independently modulated.

The token identifies a subsequent transmitter, in some embodiments. The token's identification of a subsequent transmitter includes any of an identification of which transmitter is to transmit next, length of time the next transmitter should transmit for, and transmit timing data.

The system may then transmit an outgoing beamform signal including a data portion and a token. After which the system may wait for a return transmission, or a timeout. A timeout check is performed which indicates failure if the subsequent transmitter fails to transmit according to the transmit timing data.

The system may also be enabled, in some embodiments, to maintain a list of active transmitters. This list of active transmitters may be updated periodically. For example, in some embodiments, a particular transmitter can be removed from the list of active transmitters in response any of: an explicit request from the particular transmitter, a period of inactivity from the particular transmitter, failure to receive a return transmission from the particular transmitter a set number of times, and failure to receive the return transmission from the particular transmitter at a particular failure rate. Likewise, a particular transmitter may be added to the list of active transmitters when the incoming transmission is received from the particular transmitter.

Note that the various features of embodiments of the present invention described above may be practiced alone or in combination. These and other features of various embodiments of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

As previously disclosed, recent technological developments have enabled long distance data communications between aircraft and base stations. In some embodiments, this long range communication technology includes the usage of beamforming on the unlicensed radio spectrum to achieve the necessary range and data transfer rates needed. In addition, by null steering, potential interference sources may be ignored. This enables a data communication system with higher fidelity, range, and data rates for substantially less capital investment than satellite or cellular systems.

Figure 1:
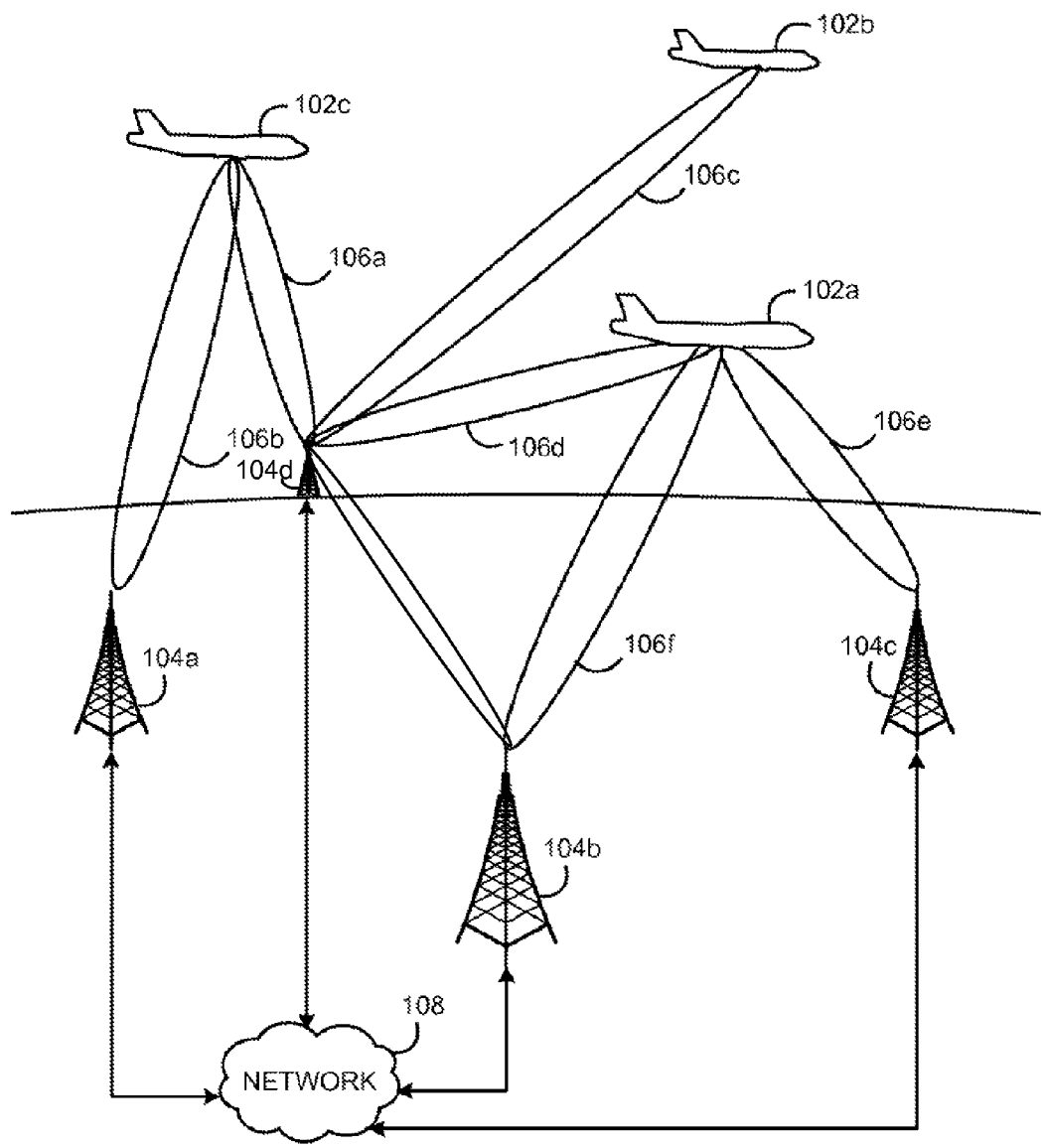
FIG. 1 is an example illustration of more than one aircraft in wireless broadband communication with a plurality of surface based antenna arrays, in accordance with some embodiments of the present invention.

Looking briefly at FIG. 1, such broadband wireless communication systems may be used to provide a data communication link to aircraft 102a and 102b. This link may be used to provide data networking for multiple users located on the aircraft. For example, the aircraft 102a may use a device to communicate with one or more base stations 110a. This connection may then be shared with a variety of users including passengers on board the aircraft 102a and 102b.

This broadband wireless communications link may be used for a wide variety of services including one or more of the following, alone or in any combination: aircraft entertainment, such as, for example, audio and/or video streaming, Internet access, on-demand movies, and the like; aircraft security system operation, such as, for example, streaming real-time cockpit/passenger cabin video and/or audio to the surface, flight tracking, communications between flight crews and the surface, and the like; providing information services, such as, for example, integrating a terminal wireless system (i.e., the same system that downloads content at the gate); travel-related services (such as hotel, car, restaurant, and/or flight reservations); high-speed Internet access for aircraft passengers; and so on.

Furthermore, a single communication link to surface may be shared with other systems on the aircraft 102a and with passengers using any data networking technology, including a WiFi network, Ethernet connections, and the like. Services may be hosted on the aircraft 102a using this data networking technology either alone, or in combination with the surface communication link. For example, in some embodiment, the aircraft 102a may include a gambling server that is activated upon entering airspace that is not subject to gambling laws and regulations. In this manner, passengers may access the gambling server and place wagers, play casino-like games (e.g., slot machines, blackjack, video poker, and the like). In some embodiments, the communication link is used, for example, to verify financial information, to transfer money, and the like. Some implementations use PayPal or other Internet payment service to effect such transfers.

One problem, as noted previously, is that for traditional data communication systems the transmission source and receiver device are typically in relative close proximity to one another. Thus, the delay between transmission and receipt is very short. Typically Wi-Fi protocols may thus be utilized to arbitrate resource contention.

In the long ranged data transmissions, however, there may be considerable delay between transmission and receipt of a data signal. This delay may result in traditional protocols to be insufficient or unworkable for long ranged communications.

Note that in the remainder of this application particular attention will be placed upon protocols for transmission of data to and from an airborne platform. It is intended, however, that the present invention be adapted for use for a wide variety of long range data transmission applications. For example, the MAC optimization may work equally well for long range wireless communication system and methods suited for use in maritime applications such as cargo and cruise ships; for locomotive data transfer, such as cargo, commuter and high speed trains; and/or for stationary data locations, such as off-grid homes or the like.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Wireless Broadband Data Delivery

In some embodiments, at FIG. 1, a broadband wireless communication system 200 enables data communication with one or more Aircraft 102a, 102b and 102c. Aircraft 102a, 102b and 102c communicate with one or more Antenna Arrays 104a, 104b, and 104c across a wireless link 106a, 106b, 106c, 106d, 106e and 106f. In some embodiments, the wireless link 106a, 106b, 106c, 106d, 106e and 106f may include directional signal propagation generated from phased antenna arrays 104a, 104b, 104c and 104d. Additionally, data communications may be between surface platforms and base stations. Such a technique is known in the art as "beamforming."

Adaptive signal processing, such as that utilized for the beamforming discussed in this application, uses an array of elements, and has long been a solution to the problem of combating interference signals in communication systems. However, with the introduction of compact, inexpensive digital computers, and novel and sophisticated protocols, it is now feasible to implement more complicated results from detection and estimation theory. These results enable adaptive array systems which are capable of adjusting and responding to rapid changes in the signal environment. As a consequence, these systems have much greater flexibility, reliability, and improved reception over prior adaptive array systems.

Where common filter techniques using one element have proven to be effective when frequencies of interest differ from the frequencies of interference signals, adaptive array algorithms are required when the spectrum of interference signals and the desired signal overlap. An adaptive array has the ability, when properly implemented, to automatically sense and separate signals and interference noise from different directions without prior knowledge of the environment. Further, adaptive arrays may be utilized in conjunction with other interference reduction techniques, thus achieving a reduction in interference at a greater level than could be achieved using any one method.

In conventional communication systems, a direct sequence spread spectrum system is often utilized, modulating the communication signal with a pseudonoise (PN) signal and later dispreading it with the original known PN sequence. While this conventional method can reduce interference, it is limited by the length of the PN sequence. The longer the PN code, the greater the ability to separate the signal from interference noise. However, since longer PN sequences also result in longer transmission delays, the length of the PN code, and thus the ability to cancel noise, is often limited. As this is frequently the case, another method, such as an adaptive array system, is often implemented in conjunction with the spread-spectrum approach when further interference attenuation and greater channel capacity is needed.

While classical adaptive array methods have proven to be very effective for cancellation of interference signals, they are still plagued by several severe limitations. The ability of such a system to cancel interference signals is strongly influenced by the arrival angle and bandwidth of the interference signals. To alleviate these problems, an adaptive system, one which applies multiple frequency-dependent weights to each array element rather than just one weight to each element, may be utilized in order to achieve numerous benefits over the older, more classical approaches. This approach known as adaptive band-partitioning, divides the frequency spectrum into multiple narrow frequency bins, and then performs spatial cancellation on each bin. The primary advantage of this approach is the ability to cancel interference signals of appreciable bandwidths. Furthermore, the system also has the ability to cancel a greater number of narrowband interference signals. While the classical approach is capable of attenuating N-1 narrowband interference signals, N being the number of antenna elements in the array, the new proposed system has the ability of attenuating N-1 narrowband interference signals in each frequency bin.

The Antenna Arrays 102a, 102b and 102c are coupled to local base stations, respectively. Each base station may supply the processing requirements for directional data transmission at the Antenna Arrays 102a, 102b and 102c, as will be described in greater detail below.

The local base stations may be connected to a network 108, such as, for example, the Internet. Connection of the local base stations to the Network 108 may be accomplished via a wired connection, wirelessly (i.e., radio signal, microwave signal, etc.), or through any reasonable combination. Any number of base stations may be used. For example, a high-capacity system covering the continental United States may include over 50 base stations and Antenna Arrays 104a, 104b, and 104c strategically located based on customer utilization and demands.

The Network 108 may also couple to a centralized processing center which may provide greater coordination of base station management. Likewise, the centralized processing center may likewise collect and host information and data for the aircraft.

A broadband wireless communication system enabling broadband wireless communications with aircraft 102a and 102b can be implemented using cellular, sectorized Antenna Arrays 104a, 104b, and 104c that are tied to a network 108 via Base Stations, such as, for example, the public switched telephone network ("PSTN"), a private network, the Internet, and the like. Antenna Array 104a, 104b, and 104c frequency allocations may be made according to widely known techniques used in mobile telecommunications; however, an aircraft flying only 10,000 feet in the sky has line-of-sight radio coverage of over 120 miles in every direction. Accordingly, an aircraft is likely to be capable of line-of-sight communications with multiple Antenna Arrays 104a, 104b, and 104c. Furthermore, two aircraft 102a and 102b flying at 10,000 feet may be able to conduct line-of-sight communications over a distance of 240 miles. As altitude increases, the aircrafts' 102a and 102b line of sight communications range increases.

To improve the spectral efficiency of the broadband wireless communication system, it is desirable to use directional antennas. Directional antennas use multiple antennas in each Antenna Array 104a; each antenna is fed the same foundation signal but that signal is altered for some antennas by changing the phase and sometimes both phase and amplitude to generate directional transmissions. This spatial selectivity is achieved by using adaptive or fixed receive/transmit beam patterns. This is known in the art, as noted above, as beamforming. Beamforming may be utilized to send data signals a large distance to the target with considerable effective power (gain).

Traditionally, beamforming has been limited in its effectiveness. For example, the use of beamforming on rapidly moving devices, such as an aircraft, is known to be difficult due to Doppler Effects. Likewise, the added benefit in gain by utilizing beamforming is not realizable in traditional systems because in these systems the ability to synchronize the two communicating antenna arrays is limited to the coverage area of a single antenna transmitting in an omnidirectional fashion.

Embodiments of the present invention overcome these technological hurdles by enabling beamform synchronization protocols, enhanced handling of Doppler Effects, null steering and other means of enabling efficient and effective usage of a beamforming data communication system in conjunction with aircraft.

In some embodiments of the present invention the surface based antenna array may include four or more antennas. Likewise, the antenna array located at the aircraft may consist of four or more antennas. This may be contrasted with typical WiMAX and LTE systems which merely employ two antennas on the receiving end, and a single antenna for transmission. In this embodiment of the present invention, all four of the array antennas are utilized for both transmission and receiving. Note that surface implies any ground based, or marine based stations. Likewise, a surface based system may be fixed or stationary in some embodiments.

Having four antennas enables the arrays to project four beamforms, exhibit four distinct desired nulls, or a combination thereof as will be described in greater detail below. Of course, in other embodiments, more or fewer antennas may be included in the arrays on the surface and on the aircraft. Note that a system, such as that described in this embodiment of the invention, may have a functional range of over 100 miles with data rates of 100 Mbps entirely as a consequence of antenna performance without an increase in delivered power to the antenna.

Further, while in some embodiments the aircraft antenna array has the same number of antennas as the surface based array; it is considered that different number of antennas may be utilized by each array as is desired. For example, in a crowded region which a large number of aircraft travel, such as near an airport, it may be desirous for the surface based antenna arrays to include many more than four antennas, as this enables the array to generate a larger number of beams, thereby enabling the surface array to maintain communication with more aircraft at a time.

II. MAC Optimization

As previously noted, since the distance between traditional WiFi devices is typically no more than a few hundred feet, signals can propagate between devices in very little time (i.e., on the order of 0.1 μsec or less). Thus, there is little propagation delay. This means that there is typically less than 0.1 μsec between when a transmission begins and when other devices can receive the transmission. With small propagation delays, a relatively efficient media access control ("MAC") layer can be implemented with devices employing random transmit wait times on the order of microseconds.

However, when distances between devices increases, propagation delays increase proportionally. For example, if devices are 100 miles apart, as is often the case in the above disclosed data communication system, propagation delays may be on the order of milliseconds instead of microseconds (e.g., 5 μsec×100=0.5 msec). A significant amount of data can be transmitted and lost in 0.5 msec before a collision is detected. Furthermore, the chance of collision is increased. As distances between devices increases, it becomes desirable to use an improved MAC that overcomes the limitations of CSMA/CA.

Figure 2:
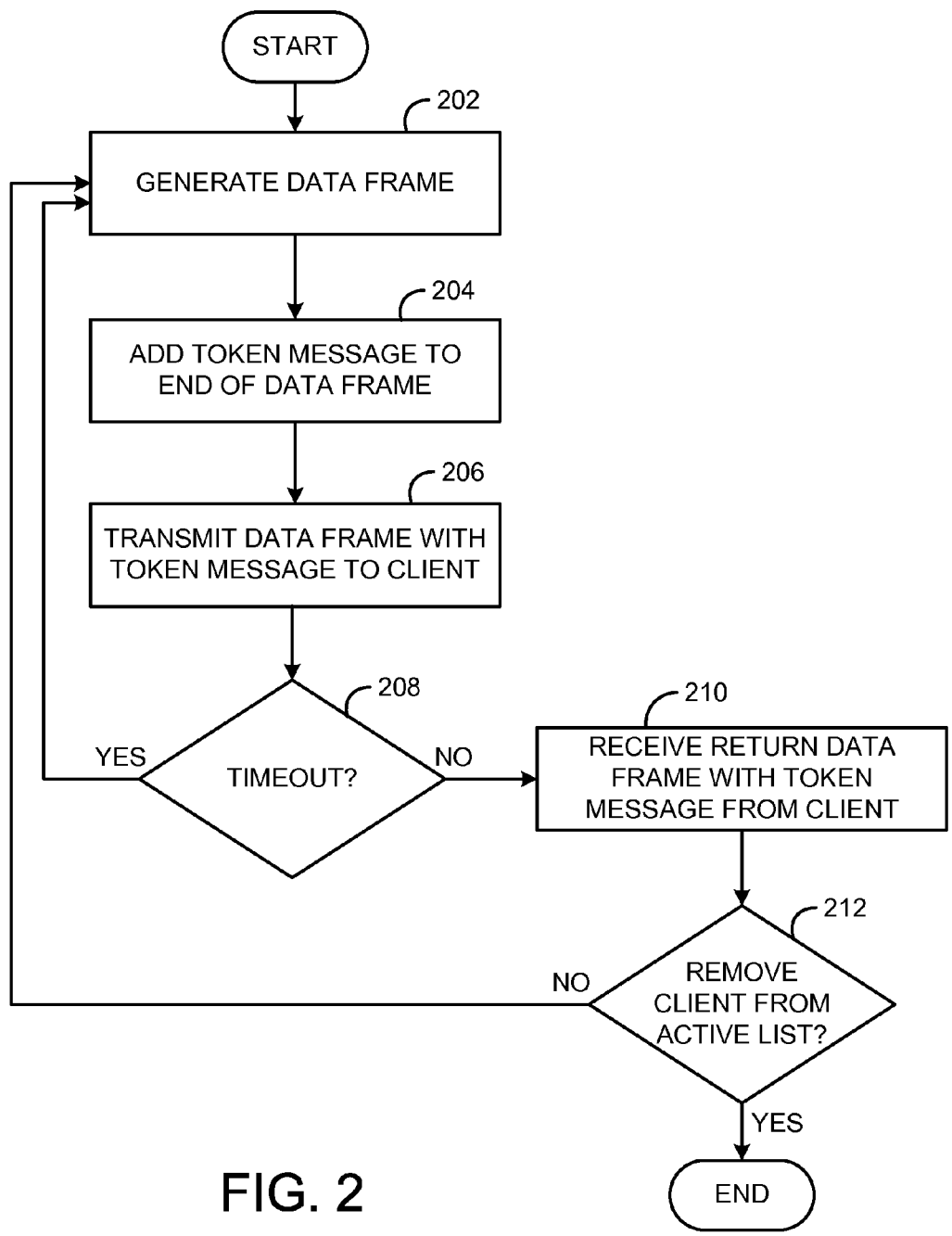
FIG. 2 is an example flow chart for the process of an improved media access control protocol for long range wireless broadband communication in accordance with some embodiments of the present invention.

An improved MAC may be used to accommodate greater distances and achieve fewer, if any, collisions and provide high throughput. FIG. 2 provides an example flow diagram for an embodiment of an improved MAC with a convention Wi-Fi physical layer ("PHY") (such as that used in 802.11a, 802.11b, 802.11g, and/or 802.11n). The improved MAC, instead of using CSMA/CA, sends a phy message with token, for example, at the end of a transmission. The token message may include information, such as, for example, the following: (i) identification of which device is to transmit next; (ii) how long the next client should transmit; (iii) transmit now bit or transmit some time later; and/or the like.

In some embodiments of the improved MAC, a Base Station generates the data frame at step 202, and the token at step 204. The process then proceeds to step 208 where the base station transmits the frame of data (consisting of X OFDM bursts) to a client, adding an extra burst at the end to signify that it is the client's turn to transmit (i.e., the token). The base station then waits for a return transmission from the client.

Should the Base Station not receive the return token in a determined amount of time (a timeout) at step 208, the Base Station proceeds as if it has the token by returning to step 202. Thus, in the case of a lost message/token, the Base Station does not wait indefinitely.

Otherwise, the client in turn transmits data and follows with a burst at the end to signify it is done, essentially handing the token back, as indicated at step 210. In some embodiments, the token is sent as the last burst so that the receiver knows the other side has finished transmitting and doesn't transmit too early. This is especially the case when the receiver processes the bursts as they come in.

In some embodiments, the token may be modulated independently from data. If a frame of data may be modulated at, for example, BPSK, QPSK, 16QAM, 64QAM, or the like, the token can be at a different modulation, which may be completely independent from the data modulation. For example, in some implementations, it may be desirable to modulate the token at the lowest possible modulation rate (e.g., ½ rate BPSK). Because the token message may be relatively short, the overhead of transmitting the token message at a lower modulation should not significantly impact performance.

In some embodiments where there are multiple clients, the Base Station may be enabled to distribute tokens in a variety of ways. For example, in some implementations, the Base Station maintains an active list of client devices. Periodically, or randomly, the Base Station sends a token to each client to check if the client has something to send.

In maintaining a list of active clients, a Base Station periodically removes clients from the list, as is indicated at step 212. If the client is removed from the active list the process concludes. Otherwise, the communication between base station and client may continue. In some instances, a client may become inactive through an explicit communication with the Base Station. However, in some embodiments, clients are removed from the list of active clients after a period of inactivity. In addition (or alternatively), a client may be removed upon occurrence of some condition. In one embodiment, active clients are removed from the list after reaching a predetermined number of failures or a predetermined failure rate. For example, if a client fails to pass the token back to the Base Station a predetermined number of times, then the Base Station may remove the client from the list of active clients. Alternatively, clients may be removed upon occurrence of N failures out of M attempts (such as 3 failures out of 4 attempts) failures or N consecutive failures of the Base Station receiving the token back from the given client.

Some embodiments of the improved MAC also may provide periodic opportunities for non-active clients to transmit. For example, periodically (such as once every second), a Base Station can send a generic token with which any non-active client may respond and hence enter (or re-enter) the network. When a non-active client responds, the Base Station adds the responding client to the list of active clients. In this manner, new clients entering the coverage of a Base Station can get assigned a token without interfering ongoing traffic between Base Station and other clients. The Base Station plans/schedules all traffic by sending data to active clients and tokens to control transmission by active clients, as well as planning unknown clients to enter at controlled intervals.

Note that additional implementations of the improved MAC design will be apparent to one skilled in the art.

In sum, systems and methods for improved MAC protocols for long range wireless broadband data communication are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the system and methods has been described in functional terms, embodiments of the present invention may include entirely hardware, entirely software or some combination of the two. Additionally, manual performance of any of the methods disclosed is considered as disclosed by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A method for media access control optimization for long distance wireless communication between transmitters and receivers associated with a surface platform and a base station, the method comprising:

receiving an incoming beamformed signal, wherein the incoming beamformed signal includes an incoming data portion and an incoming token, wherein the incoming token includes a subsequent transmitter identifier; and transmitting an outgoing beamformed signal, wherein the outgoing beamformed signal includes an outgoing data portion and an outgoing token, wherein the outgoing token includes a subsequent transmitter identifier, wherein the data portion and the token are independently modulated, with the token being modulated at a lower rate than the data portion.

2. The method as recited in claim 1, wherein the subsequent transmitter identifier includes at least one of identification of which transmitter is to transmit next, length of time the next transmitter should transmit for, and a transmit timing data.

3. The method as recited in claim 2, further comprising performing a timeout check after transmitting the outgoing beamform signal, wherein the timeout check indicates failure if a subsequent transmitter fails to transmit according to the transmit timing data.

4. The method as recited in claim 3, further comprising maintaining a list of active transmitters.

5. The method as recited in claim 4, further comprising removing a particular transmitter from the list of active transmitters in response to at least one of an explicit request from the particular transmitter, a period of inactivity from the particular transmitter, failure to receive a return transmission from the particular transmitter a set number of times, and failure to receive the return transmission from the particular transmitter at a particular failure rate.

6. The method as recited in claim 4, further comprising adding a particular transmitter to the list of active transmitters when the incoming transmission is received from the particular transmitter.

7. A method for media access control optimization for long distance wireless communication between transmitters associated with a surface platform and a base station, the method comprising:
   maintaining a list of active transmitters;
   receiving an incoming beamform signal, wherein the incoming beamform signal includes a data portion and a token, wherein the data portion and the token are independently modulated, and wherein the token identifies a subsequent transmitter, and wherein the identifying the subsequent transmitter includes at least one of identification of which transmitter is to transmit next, length of time the next transmitter should transmit for, and a transmit timing data;
   adding a particular transmitter to the list of active transmitters when the incoming transmission is received from the particular transmitter
   transmitting an outgoing beamform signal, wherein the outgoing beamform signal includes a data portion and a token, wherein the data portion and the token are independently modulated, with the token being modulated at a lower rate than the data portion;
   performing a timeout check, wherein the timeout check indicates failure if the subsequent transmitter fails to transmit according to the transmit timing data; and
   removing a particular transmitter from the list of active transmitters in response to at least one of an explicit request from the particular transmitter, a period of inactivity from the particular transmitter, failure to receive a return transmission from the particular transmitter a set number of times, and failure to receive the return transmission from the particular transmitter at a particular failure rate.

8. A media access control optimization system for long distance wireless communication between transmitters and receivers associated with a surface platform and a base station, the system comprising:
   an antenna configured to:
      receive an incoming beamformed signal, wherein the incoming beamformed signal includes an incoming data portion and an incoming token, wherein the incoming token includes a subsequent transmitter identifier; and
      transmit an outgoing beamformed signal, wherein the outgoing beamformed signal includes an outgoing data portion and an outgoing token, wherein the outgoing token includes a subsequent transmitter identifier, and wherein the data portion and the token are independently modulated, with the token being modulated at a lower rate than the data portion.

9. The system as recited in claim 8, wherein the subsequent transmitter identifier includes at least one of identification of which transmitter is to transmit next, length of time the next transmitter should transmit for, and a transmit timing data.

10. The system as recited in claim 9, further comprising a processor configured to perform a timeout check after transmitting the outgoing beamform signal, wherein the timeout check indicates failure if a subsequent transmitter fails to transmit according to the transmit timing data.

11. The system as recited in claim 10, wherein the processor is further configured to maintain a list of active transmitters.

12. The system as recited in claim 11, wherein the processor is further configured to remove a particular transmitter from the list of active transmitters in response to at least one of an explicit request from the particular transmitter, a period of inactivity from the particular transmitter, failure to receive a return transmission from the particular transmitter a set number of times, and failure to receive the return transmission from the particular transmitter at a particular failure rate.

13. The system as recited in claim 11, wherein the processor is further configured to add a particular transmitter to the list of active transmitters when the incoming transmission is received from the particular transmitter.

* * * * *